United States Patent
Fukumoto (10) Patent No.: US 7,599,202 B2
(45) Date of Patent: Oct. 6, 2009

(54) DC-AC CONVERTER WITH FEEDBACK SIGNAL CONTROL CIRCUIT UTILIZING POWER SUPPLY VOLTAGE, CONTROLLER IC THEREFOR, AND ELECTRONIC APPARATUS UTILIZING THE DC-AC CONVERTER

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 519 days.

(21) Appl. No.: 10/596,823

(22) PCT Filed: Jan. 27, 2005

(86) PCT No.: PCT/JP2005/001557

§ 371 (c)(1),
(2), (4) Date: Jun. 26, 2006

(87) PCT Pub. No.: WO2005/071825

PCT Pub. Date: Aug. 4, 2005

(65) Prior Publication Data

US 2009/0021970 A1    Jan. 22, 2009

(30) Foreign Application Priority Data

Jan. 27, 2004    (JP)    ............................. 2004-017929

(51) Int. Cl.
*H02M 7/537*    (2006.01)
(52) U.S. Cl. ............................. 363/131; 363/97; 363/98; 363/132
(58) Field of Classification Search ............. 363/97, 363/98, 131, 132
See application file for complete search history.

(56) References Cited

U.S. PATENT DOCUMENTS 5,619,402 A * 4/1997 Liu ............................. 363/20

(Continued)

FOREIGN PATENT DOCUMENTS

JP    10-285942 A    10/1998

(Continued)

OTHER PUBLICATIONS

International Search Report issued in the corresponding International Application No. PCT/JP2005/001557, mailed May 17, 2005.

*Primary Examiner*—Jared J Fureman
*Assistant Examiner*—Manuel Hernandez
(74) *Attorney, Agent, or Firm*—Keating & Bennett, LLP (57) ABSTRACT

An inverter controls the power supplied to a load such as a CCFL connected to a secondary winding of a transformer by means of pulse width modulation (PWM) control of the switches of a semiconductor switching circuit connected to the primary winding of the transformer. The current and voltage supplied to the load are fed back to the inverter in the form of a current error signal and a voltage error signal, respectively, from which a feedback signal is formed in accordance with the magnitudes of these signals. Thus, when the DC supply voltage of a DC power supply sharply rises, the inverter changes the feedback signal directly, that is, without waiting for the changes to occur in the load current and load voltage, so as to reduce the power supplied to the load. Thus, over-current and resultant viewer's discomfort is suppressed. Sudden shut down of the inverter are also prevented from occurring.

8 Claims, 3 Drawing Sheets

U.S. PATENT DOCUMENTS

| | | | |
|---|---|---|---|
| 5,959,857 A * | 9/1999 | Nagahara | 363/132 |
| 6,011,360 A * | 1/2000 | Gradzki et al. | 315/244 |
| 6,198,198 B1 | 3/2001 | Fujimura et al. | |
| 6,259,615 B1 * | 7/2001 | Lin | 363/98 |
| 6,381,151 B1 * | 4/2002 | Jang | 363/21.01 |
| 6,580,627 B2 * | 6/2003 | Toshio | 363/98 |
| 6,625,042 B2 * | 9/2003 | Tolle et al. | 363/17 |
| 7,236,375 B2 * | 6/2007 | Fukumoto et al. | 363/15 |
| 2001/0036096 A1 | 11/2001 | Lin | |
| 2002/0180380 A1 | 12/2002 | Lin | |
| 2003/0206426 A1 * | 11/2003 | Lin et al. | 363/132 |
| 2004/0160794 A1 | 8/2004 | Lin | |
| 2005/0219863 A1 * | 10/2005 | Fukumoto et al. | 363/16 |

FOREIGN PATENT DOCUMENTS

| | | | |
|---|---|---|---|
| JP | 2002-233158 A | | 8/2002 |
| JP | 2004166445 A | * | 6/2004 |

* cited by examiner

DC-AC CONVERTER WITH FEEDBACK SIGNAL CONTROL CIRCUIT UTILIZING POWER SUPPLY VOLTAGE, CONTROLLER IC THEREFOR, AND ELECTRONIC APPARATUS UTILIZING THE DC-AC CONVERTER

TECHNICAL FIELD

This invention relates to a DC-AC converter (hereinafter referred to as inverter) for generating an alternating voltage to drive a load from a DC power supply such as an adapter of an electric apparatus and a battery. The invention also relates to a controller for the DC-AC converter and an electronic apparatus utilizing the inverter.

BACKGROUND ART

Cold cathode fluorescent lights (CCFLs) have been increasingly used as a back light source of a liquid crystal display (LCD) for use in, for example, a monitor of a notebook PC, LCD TV set, and car navigation system. Such a CCFL has substantially the same high efficiency and a long life as a usual hot cathode fluorescent light, without using a filament of a hot cathode fluorescent light.

In order to start up and operate the CCFL, high AC voltages are required. For example, a startup voltage of about 1000 V and an operating voltage of about 600 V (in rms value) are required. (Voltages will be hereinafter given in rms value.) These high AC voltages are generated from a DC power supply provided in, for example, a notebook PC and a liquid crystal TV set, using an inverter.

There has been proposed in Japanese Patent Application Laid Open 2002-233158 (which will be referred to as Patent Document 1) an inverter for providing AC power to a CCFL in the form of a full-bridge type (or H-bridge type) inverter that uses four semiconductor switches. This inverter includes a transformer having a primary winding connected in series with the output end of the H-bridge via a serial resonant capacitor, and a secondary winding to be connected to a load. Of the four semiconductor switches constituting the H-bridge, a first set of two semiconductor switches establishes a current path through the primary winding in a first direction, while a second set of two semiconductor switches establishes a current path through the primary winding in a second direction.

By feeding back the load current flowing through the secondary winding to a control circuit and comparing it with a reference voltage, the inverter generates a control signal consisting of pulses having a fixed pulse width and having controlled relative pulse positions (i.e. have a controlled duty ratio). The control signal is supplied to the semiconductor switching circuit of the H-bridge to regulate the power supplied to the load. The secondary voltage across the secondary winding is monitored to detect an over-voltage that exceeds a predetermined level, and, if it is detected, operation of the inverter is stopped to prevent an over-voltage from occurring. Over-voltage that could occur in the event that the load current lowers below a predetermined level is also prevented by setting the duty ratio to a minimum value.

This type of inverters mostly utilize a battery as a power supply. To charge the battery, a power supply adapter is commonly used. When this power supply adapter is connected to, or disconnected from, the battery, the power supply voltage supplied to the inverter can sharply change (rise or drop). Such sharp change in the power supply voltage can also take place when the magnitude of another load connected to the battery, such as an in-vehicle brake circuit, sharply changes.

In the inverter of the Patent Document 1, when the power supply voltage rises sharply, its display momentarily brightens because it takes some time before the current feedback control takes effect, which gives the viewer of the display discomfort. Moreover, since the load current increases rapidly in the meanwhile, it can cause an undesirable damage to the loads including the CCFL.

Further, when the power supply voltage drops sharply, the load current also decreases accordingly. In the inverter of the Patent Document 1, in order to prevent an over-voltage from being generated due to turning off (or disconnection) of the CCFL, the duty ratio of the semiconductor switching circuit is set to a minimum level if the load current decreases below a predetermined level. In cases where electronic apparatus utilizing this inverter is used in a very cold region for example, the load current of the CCFL can drop and never recover to the normal level, resulting in a shut down of the inverter.

It is therefore an object of the present invention to provide an inverter capable of performing constant-current control on a load connected to a secondary winding of a transformer through pulse width modulation (PWM) of the switches of a semiconductor switching circuit connected to the primary winding of the transformer, thereby suppressing view's discomfort and possible over-current caused by a sharp change (rise and fall) in power supply voltage, or preventing shut down of the inverter. It is another object of the invention to provide a controller IC for use with such inverter. It is a further object of the invention to provide an electronic apparatus equipped with a light emitting apparatus driven by the inverter.

DISCLOSURE OF THE INVENTION

An inverter in accordance with one aspect of the invention comprises:
a transformer having a primary winding and at least one secondary winding;
a semiconductor switching circuit for allowing electric current to flow from a DC power supply through the primary winding in a first or a second direction;
a current detection circuit for detecting the current flowing through the load,
a voltage detection circuit for detecting the voltage applied to the load connected to the secondary winding;
a current-error signal generating circuit for generating a current-error signal based on the current detection signal and a current reference signal;
a voltage-error signal generating circuit for generating a voltage-error signal based on the voltage detection signal generated by the voltage detection circuit and a voltage reference signal;
a feedback signal formation circuit for forming a feedback signal in accordance with the magnitudes of the current-error signal and voltage-error signal; and
a switch drive circuit for forming a drive signal for switching on and off the semiconductor switching circuit in accordance with the feedback signal.

A controller IC in accordance with another aspect of the invention is adapted to drive a semiconductor switching circuit for flowing current through a primary winding of a transformer in a first or a second direction to supply AC power to a load connected to a secondary winding of the transformer, the controller IC comprising:
a feedback signal formation circuit for forming a feedback signal in accordance with the magnitudes of a current-error signal and a voltage-error signal, the current-error signal generated based on both the current flowing through the load and a current reference signal, and the voltage-error signal generated based on both a voltage detection signal associated with the voltage applied to the load and a voltage reference signal; and a switch drive circuit adapted to form a drive signal for switching the semiconductor switching circuit in accordance with the feedback signal.

The switch drive circuit of the inventive inverter and controller IC may have a PWM signal generation circuit for generating a PWM signal, upon receipt of a triangular wave signal from a triangular wave signal generation circuit and the feedback signal, by comparing the triangular wave signal and the feedback signal.

The feedback signal formation circuit may include:

a current-error control transistor having a control input for receiving the current-error detection signal; and a voltage-error control transistor having a control input for receiving the voltage-error detection signal, the voltage-error control transistor connected in parallel with the current-error control transistor so as to output the feedback signal from the node where the current-error control transistor is connected in parallel with the voltage-error control transistor.

The inventive DC-AC converter and controller IC may further include a feedback signal control circuit adapted to change the feedback signal so as to reduce the electric power supplied to the load when the DC power supply voltage of the DC power supply rises abruptly.

The feedback signal control circuit may include a sharp-voltage-change detection circuit receiving the DC power supply voltage and adapted to generate a sharp-voltage-change signal by differentiating the DC power supply voltage; and a reduction circuit connected between a node having the potential of the feedback signal and a node having a predetermined potential, and controlled by the sharp-voltage-change signal. The reduction circuit may include a series circuit of a transistor switch and a resistor. The sharp-voltage-change detection circuit may include a series circuit of capacitor and a resistor.

An electronic apparatus of the invention is equipped with a battery, an inventive inverter for generating AC power from the DC voltage of the battery, and a light emitting apparatus driven by the AC power supplied from the inverter. The light emitting apparatus may be a CCFL.

According to the invention, the current and voltage supplied to a load such as a CCFL are fed back to the inverter to form a current-error signal and a voltage-error signal, respectively, and to form a feedback signal FB based on the magnitudes of the current-error and voltage-error signals. As a consequence, if the DC power supply voltage exhibits a sharp drop, the current and voltage supplied to the load are automatically changed by the feedback signal FB to recover. Thus, shutdown of the inverter that can occur in conventional inverters can be prevented in the inventive inverter.

In the invention, in the event that the DC power supply voltage sharply rises, the feedback signal FB is changed directly, that is, without waiting for the anticipated change in load current or load voltage, so as to reduce the electric power supplied to the load. Accordingly, undesirable changes in display condition of the monitor can be reduced to suppress viewer's discomfort, and possible damage to the load caused by an over-current can be reduced.

In order to change the feedback signal FB, it suffices to detect a sharp change in the DC power supply voltage by the differentiation circuit to activate the reduction circuit. Thus, the invention can be realized in a simple structure.

THE BEST MODE FOR CARRYING OUT THE INVENTION

Referring to the accompanying drawings, the invention will now be described in detail by way of example with reference to an inverter for generating from a DC power supply an AC voltage to drive a load, a controller IC therefor, and an electronic apparatus utilizing the inverter.

Figure 1:
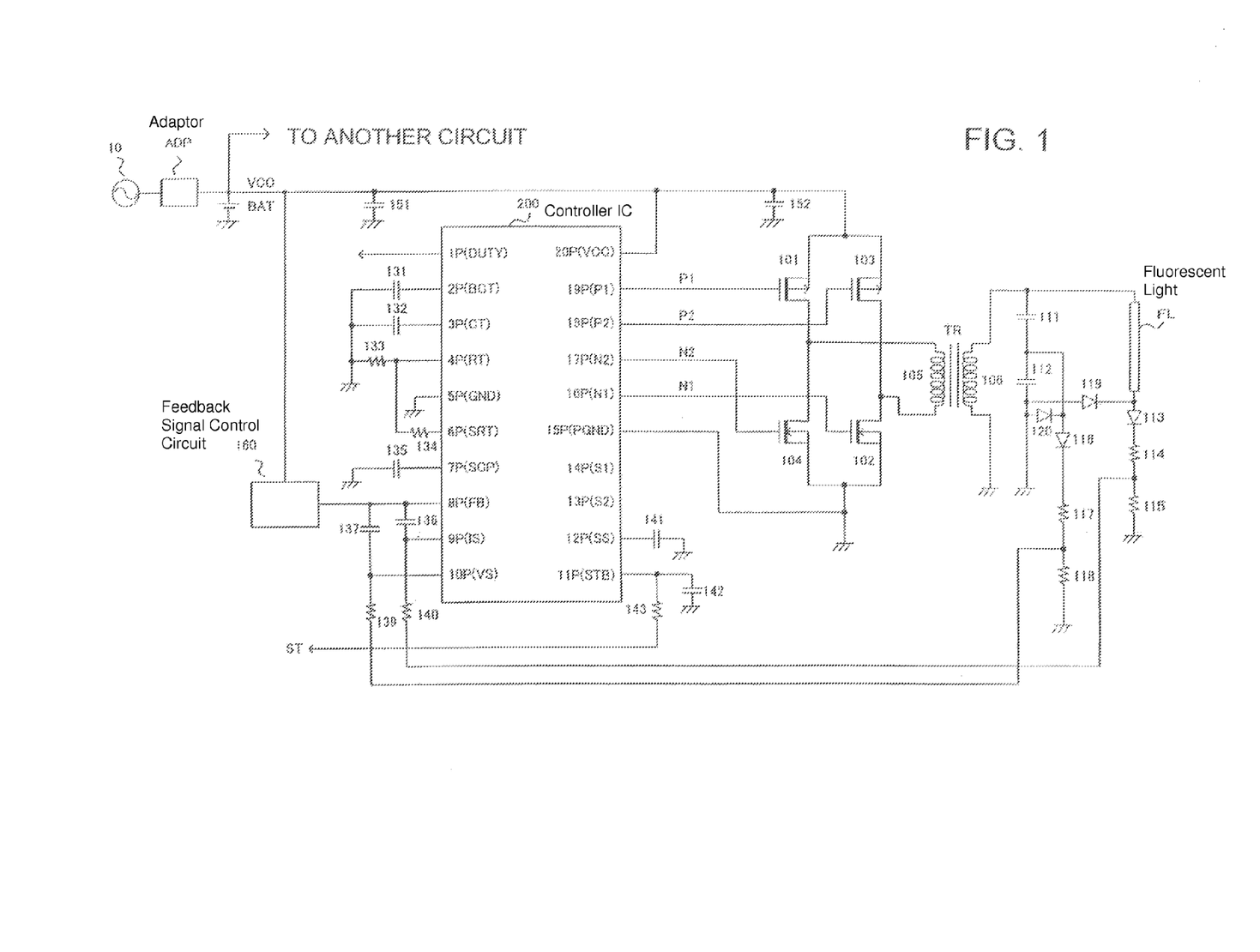
FIG. 1 shows an overall arrangement of an inverter in accordance with one embodiment of the invention.
Figure 2:
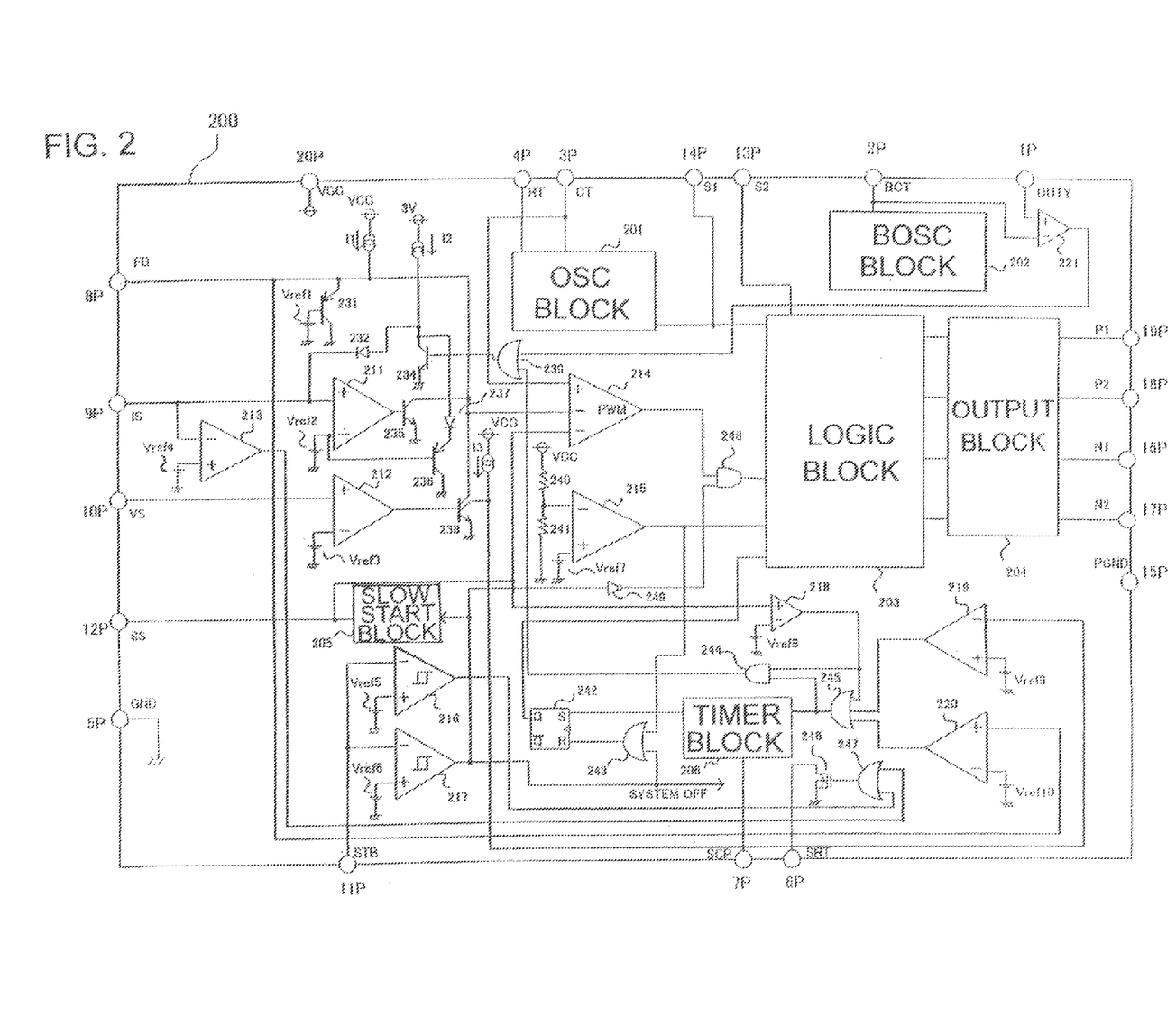
FIG. 2 shows the internal structure of a controller IC of FIG. 1.

Referring to FIG. 1, there is shown an over-all arrangement of a first inverter according to the invention that utilizes an insulated transformer and a full-bridge type (or H-bridge type) switching circuit to carry out PWM control. FIG. 2 illustrates the internal structure of a controller IC for controlling the inverter of FIG. 1. The semiconductor switching circuit can be of a half bridge type.

As shown in FIG. 1, a first switch in the form of a P-type MOSFET (hereinafter referred to as PMOS) 101 and a second switch in the form of an N-type MOSFET (hereinafter referred to as NMOS) 102 together establish a first current path in a first direction through the primary winding 105 of a transformer TR. A third switch in the form of a PMOS 103 and a fourth switch in the form of an NMOS 104 together establish a second current path in a second direction through the primary winding 105 of the transformer TR. Each of the PMOSs 101 and 103 and NMOSs 102 and 104 has a body diode (that is, a back gate diode). The body diode enables a current to flow in the direction opposite to its intrinsic current direction. An additional diode may be implemented to provide the same function as the body diode.

A DC power supply voltage VCC of a battery BAT is supplied to the primary winding 105 of the transformer TR through the PMOSs 101 and 103 or NMOSs 102 and 104 to induce a high voltage across a secondary winding 106 in accordance with the winding ratio of the primary to the secondary winding. The induced high voltage is supplied to a cold cathode fluorescent light FL to turn it on.

The battery BAT is charged by connecting it to an adapter ADP that is energized by commercial power supply 10. The adapter ADP has a built-in battery charging circuit (or charger), which can charge a discharged battery BAT (of 12V for example) to a fully charged state (for example, 16V).

The battery BAT may provide the DC supply voltage VCC not only to the inverter of the invention but also to other electric components (or other circuits).

A feedback signal control circuit 160 is a circuit for detecting a sharp decrease in the DC power supply voltage VCC to control a feedback signal.

Together with resistors 117 and 118, capacitors 111 and 112 detect the voltage supplied to the cold cathode fluorescent light FL and feed it back to the controller IC 200. Resistors 114 and 115 detect the current that flows through the cold cathode fluorescent light FL and feed it back to the controller IC 200. The capacitor 111 is adapted to give rise resonance with the inductive component of the transformer TR. The parasitic capacitance of the cold cathode fluorescent light FL contributes to the resonance. Elements 113, 116, 119, and 120 are diodes. Capacitors 151 and 152 are provided to stabilize the power supply voltage VCC.

The controller IC 200 has a multiplicity of input/output pins. A first pin 1P is a mode switching terminal for switching the mode of the controller between a PWM mode and an intermittent-operation mode (hereinafter referred to as burst mode). The first pin 1P is externally fed with a mode switching signal and a duty signal DUTY for determining the duty ratio of the burst mode. A second pin 2P is a terminal connected to a capacitor 131 for setting a resonance frequency of a burst mode oscillator (BOSC). A triangular wave signal for use in the burst mode (referred to as burst triangular wave signal BCT) is generated at the second pin 2P.

A third pin 3P is a terminal connected to a capacitor 132 to establish an oscillation frequency of a PWM mode oscillator (OSC), which generates at the pin 3P a triangular wave signal CT for use in PWM control (the signal hereinafter also referred to as PWM triangular wave signal). A fourth pin 4P is a terminal connected to a resistor 133 for setting the level of charge current that flows through the third pin 3P. Thus through the fourth pin 4P flows current in accordance with the potential RT at the pin 4P and the resistance of the resistor 133. A fifth pin 5P is an earth terminal of the controller, having ground potential GND.

A sixth pin 6P is a terminal connected to a resistor 134 for setting the level of charge current that flows through the third pin 3P. The resistor 134 connected to the sixth pin 6P can be controllably connected in parallel with a resistor 133, or disconnected therefrom, by an internal circuit of the controller IC 200. The potential SRT of the sixth pin 6P is equal to either the ground potential GND or the potential RT of the fourth pin 4P. A seventh pin 7P is a terminal connected to a capacitor for setting a timer latch. The seventh pin 7P is connected to a capacitor 135 for determining the time limit for the protection of internal circuits of the controller IC 200. A potential SCP is generated at the pin 7P in accord with the electric charge stored in the capacitor 135.

A ninth pin 9P is an input terminal for receiving, via a resistor 140, a current detection signal (referred to as detection current) IS associated with the current flowing through the cold cathode fluorescent light FL. The detection current IS is inputted to a first error amplifier. An eighth pin 8P is an output terminal of the first error amplifier. Connected between the eighth pin 8P and the ninth pin 9P is a capacitor 136. The potential of the eighth pin 8P serves as a feedback voltage FB for performing the PWM control. In what follows voltages refer to potentials relative to the ground potential unless otherwise stated.

A tenth pin 10P is an input terminal of a second error amplifier. The tenth pin 10P is fed via a resistor 139 a voltage detection signal (hereinafter referred to as detection voltage) VS in accord with the voltage applied to the cold cathode fluorescent light FL. The detection voltage VS is inputted to the second error amplifier. A capacitor 137 is connected between the tenth pin 10P and the eighth pin 8P.

An eleventh pin 11P is a terminal for receiving a startup signal and for setting the length of startup time. The eleventh pin 11P is fed with a delayed signal STB that is obtained by delaying a startup signal ST by a resistor 143 and a capacitor 142. A twelfth pin 12P is a terminal connected to a capacitor 141 for setting up a slow startup. The capacitor 141 is connected between the twelfth pin 12P and the ground to generate at the twelfth pin 12P a slow-start voltage SS that grows slowly during a startup.

A thirteenth pin 13P is a synchronization terminal connected to another controller IC to be synchronized with the controller IC. A fourteenth pin 14P is an I/O terminal of an internal clock, which can be connected to another controller IC to cooperate with the controller IC.

A fifteenth pin 15P is an earth terminal for an external FET drive circuit. A sixteenth pin 16P is a terminal for outputting a gate drive signal N1 to the gate of the NMOS 102. A seventeenth pin 17P is a terminal for outputting a gate drive signal N2 to the gate of the NMOS 104. An eighteenth pin 18P is a terminal for outputting a gate drive signal P2 to the gate of the PMOS 103. A nineteenth pin 19P is a terminal for outputting a gate drive signal P1 to the PMOS 101. A twentieth pin 20P is a power supply terminal for receiving the power supply voltage VCC.

As shown in FIG. 2 illustrating the internal structure of the controller IC 200, an oscillation (OSC) block 201 generates a PWM triangular wave signal CT having a period of cycle determined by the capacitor 132 connected to the third pin 3P and the resistors 133-134 connected to the fourth pin 4P, and supplies the PWM triangular wave signal CT to a PWM comparator 214. The OSC block 201 also generates an internal clock synchronized to the PWM triangular wave signal CT and supplies it to a logic block 203.

Together with the capacitor 131 connected to the second pin 2P, a BOSC block 202 forms a circuit for generating a burst triangular signal BCT having a frequency determined by the capacitor 131. The frequency of the burst triangular signal BCT is set much lower than the frequency of the PWM triangular wave signal CT. (That is, BCT frequency<CT frequency.) An analog duty signal DUTY (dc voltage) supplied to the first pin 1P is compared with the burst triangular signal BCT by a comparator 221. The output of the comparator 221 is used to drive an NPN transistor (hereinafter referred to as NPN) 234 via an OR circuit 239. In the case where a (pulse width modulated) digital duty signal DUTY is supplied to the first pin 1P, a resistor is connected to the second pin 2P to cause the BOSC block 202 to generate a predetermined burst voltage.

The logic block 203 is supplied with, for example, the PWM control signal to generate switch drive signals (or PWM signals) in accordance with a predetermined logic. An output block 204 generates gate drive signals P1, P2, N1, and N2, in accord with the switch drive signals received from the logic block 203, and supplies them to the respective gates of the PMOSs 101 and 103 and NMOSs 102 and 104.

A slow start block 205 is started up by the output of a comparator 217 when a startup signal ST is supplied to the block 205 and the voltage STB inputted to the comparator 217, which is raised slowly by the capacitor 142 and resistor 143, exceeds a reference voltage Vref6. The output of the comparator 217 enables the logic block 203. A circuit 249 is an inversion circuit. The output of the comparator 217 resets a flip-flop (FF) circuit 242 via an OR circuit 243. As the start block 205 is started up, the slow-start voltage SS gradually rises. The slow-start voltage SS is inputted to the PWM comparator 214 as a comparison input. Thus, during a startup, PWM control is performed in accordance with the slow-start voltage SS.

During a startup, a comparator 216 turns off an NMOS 246 via an OR circuit 247 when the input to the comparator 216 exceeds a reference voltage Vref5. This causes the resistor 134 to be separated from the controller IC 200 to change the frequency of the PWM triangular wave signal CT. The OR circuit 247 is also fed with the output of a comparator 213.

A first error amplifier 211 compares the detection current IS that is proportional to the current flowing through the cold cathode fluorescent light FL with a reference voltage (current reference signal) Vref2 (which is 1.25 V for example), and generates an output in accord with the difference (or error) between them to control an NPN 235 connected to a constant-current source I1. The collector of the NPN 235 is connected to the eighth pin 8P. The potential of the eighth pin 8P serves as the feedback voltage FB inputted to the PWM comparator 214 as a comparison input.

The PWM comparator 214 compares the triangular wave signal CT with the lower one of the feedback voltage FB and the slow-start voltage SS to generate a PWM control signal and provides it to the logic block 203 via an AND circuit 248. In a steady operation reached after completion of a startup, the level of the current flowing through the cold cathode fluorescent light FL is automatically maintained at a preset level by comparing the triangular wave signal CT with the feedback voltage FB.

It is noted that the feedback voltage FB increases or decreases smoothly since the capacitor 136 is connected between the eighth pin 8P and the ninth pin 9P. As a consequence, the PWM control is carried out smoothly, without an abrupt change.

A second error amplifier 212 compares the detection voltage VS that is proportional to the voltage across the cold cathode fluorescent light FL with a reference voltage (voltage reference signal) Vref3 (of 1.25 V for example) to generate an output voltage indicative of the difference (or error) between them. This output is used to control a double-collector type NPN 238 having one collector connected to the constant-current source I1. Since the collector of the NPN 238 is also connected to the eighth pin 8P, the feedback voltage FB is also controlled by the detection voltage VS. Incidentally, if the feedback voltage FB exceeds a reference voltage Vref1 (of 3 V for example), a PNP transistor (hereinafter referred to as PNP) 231 will be turned on to limit excessive rise of the feedback voltage FB.

A comparator 215 compares the voltage generated by dividing the power supply voltage VCC by resistors 240 and 241 with a reference voltage Vref7 (of 2.2 V for example), and inverts its output to reset the FF circuit 242 via the OR circuit 243 when the power supply voltage VCC reaches a predetermined level.

A comparator 218 compares the slow-start voltage SS with a reference voltage Vref8 (of 2.2 V for example) to turn on the NPN 234 via an AND circuit 244 and an OR circuit 239 when the voltage SS exceeds the reference voltage Vref8. With the NPN 234 turned on, a diode 232 is reversely biased by a current source I2, which enables normal operation of the first error amplifier 211. A diode 237 and a PNP 236 are provided to limit an over-voltage.

When the double collector type NPN 238 having the other collector connected to a constant-current source I3 is turned ON by the second error amplifier 212, its collector voltage lowers below a reference voltage Vref9 (of 3 V for example). This causes the output voltage of a comparator 219 to be inverted. A comparator 220 compares the feedback voltage FB with a reference voltage Vref10 (of 3 V for example). Its output voltage is inverted when the feedback voltage FB exceeds the reference voltage Vref10. The outputs of the comparators 219 and 220 and the inverted output of the comparator 218 are inputted to a timer block 206 via an OR circuit 245. The timer block causes these outputs to be outputted from the timer block 206 a predetermined time later. The FF 242 is set by the output of the timer block 206. The Q output of the FF 242 disables the logic block 203.

Next, referring to FIG. 3, operation of the inverter configured as described above will now be described especially in the event where the power supply voltage VCC sharply changes.

Figure 3:
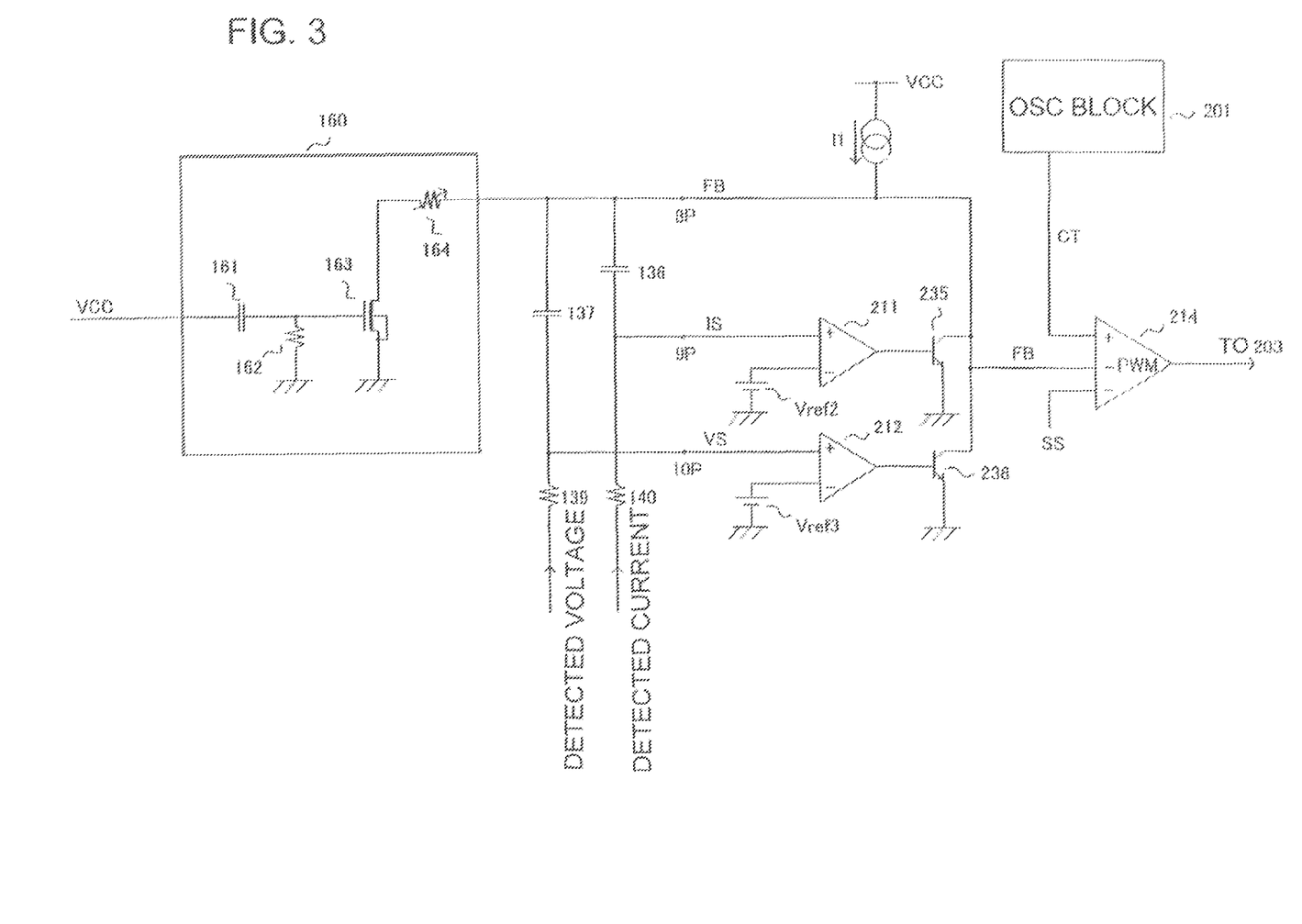
FIG. 3 is circuit diagram useful in understanding operation of the inverter in the event of a sharp change in the power supply voltage.

FIG. 3 is an excerpt from FIGS. 1 and 2, showing details of the feedback signal control circuit 160 and those portions relevant to the operation of the inverter in the event of a sharp change in the power supply voltage VCC. Thus, reference should be made to FIGS. 1 and 2 in order to understand an overall feature of the operation of the inverter.

The inverter of the invention is supplied with the DC power supply voltage VCC from the battery BAT. The battery BAT is charged by the adapter ADP when the battery BAT is connected to the adapter ADP that is connected to the commercial power supply 10. As a consequence, the DC power supply voltage VCC can vary between the voltage of the fully charged battery (16 V for example) and the voltage of the discharged battery (12 V for example).

The adapter ADP can be connected and disconnected at any point of time. If the adapter ADP is connected under the condition that the battery BAT has discharged to a certain degree, the power supply voltage VCC will sharply rise at that moment. If the adapter ADP is disconnected from the battery BAT in the middle of charging, the power supply voltage VCC will sharply fall at that moment. The degree of rise and fall of the power supply voltage VCC also depends on the manner in which the battery BAT is connected to the adapter ADP and on the performance of the charger normally included in the adapter ADP. At any rate, connecting/disconnecting the adapter ADP to/from the battery will cause a sharp change in the power supply voltage VCC.

The battery BAT provides the DC power supply voltage VCC not only to the inventive inverter but also to other loads (electric components). Thus, when one of these loads sharply changes in magnitude, the sharp change affects the DC power supply voltage VCC, thereby changing the DC power supply voltage VCC.

The inverter of the invention is designed to suppress conventional viewer's discomfort of display condition and occurrence of over-current caused by a sharp change (sharp rise and sharp drop) of the DC power supply voltage VCC, and prevent resultant sudden shut down of the inverter.

Referring to FIG. 3, there is shown the feedback signal control circuit 160 for detecting a sharp rise in the DC power supply voltage VCC to thereby control the feedback signal FB. The feedback signal control circuit 160 is supplied with the DC power supply voltage VCC, and differentiates the DC power supply voltage VCC by means of a sharp voltage change detection circuit that includes a series circuit of a capacitor 161 and a resistor 162. When the DC power supply voltage VCC abruptly goes up, a sharp voltage change signal is outputted from the node of the capacitor 161 and the resistor 162. There is provided between a node having the potential of the feedback signal FB and a node having a predetermined potential (e.g. ground potential) a reduction circuit that includes a series circuit of a variable resistor 164 and a transistor switch 163. The transistor switch 163 is turned on by the sharp voltage change signal.

In the inverter of the invention, at the time of a startup, the power supply voltage VCC is supplied to a common circuit (referred to as feedback signal formation circuit) that includes a constant-current generator I1, an NPN 235, and an NPN 238, so that the feedback voltage FB coupled with one of two (−) input terminals of the PWM comparator 214 is raised to a high level (upper limit level).

As a consequence, the slowly rising slow start voltage SS and the triangular wave signal CT are compared in the PWM comparator 214 to output a PWM control signal PWM1 in accord with the magnitude of the slow start voltage SS. It is noted that the PWM comparator 214 outputs a PWM control signal PWM1 having a high (H) level when the triangular wave signal CT is less than the slow start voltage SS and the feedback voltage FB. Based on this PWM control signal PWM1, the gate drive signals P1-N2 are formed by the logic block 203 and the output block 204, which are supplied to the respective MOSFETs 101-104 to enable the operation of the inverter.

Since the load of the inverter, i.e. cold cathode fluorescent light FL, will not be turned on before the voltage applied thereto reaches a predetermined level, the output voltage of the inverter rises with the slow start voltage SS in an early stage of the slow startup. Therefore, unlike conventional inverters, the inventive inverter will not initially apply to the cold cathode fluorescent light FL an excessive output voltage Vo (as high as 2000-2500 V, for example) determined by the initial feedback voltage FB being at its upper limit level. Moreover, since there can be no inrushing current that accompanies such excessive output voltage Vo, the cold cathode fluorescent light FL and the major circuit components (e.g. MOSFETs 101-104, transformer TR, battery BAT, etc.) of the inverter are greatly relieved of stress and damage arising from the excessive voltage.

The output voltage and output current of the inverter are detected to generate a detection voltage VS and a detection current IS, which are compared with respective reference voltages Vref2 (referred to as current reference signal) and Vref3 (referred to as voltage reference signal) by the first and second error amplifiers 211 and 212, respectively. The outputs of the error amplifiers 211 and 212 respectively control the NPN 235 and NPN 238. As the NPN 235 and NPN 238 are controlled by the detection voltage VS and detection current IS, the feedback voltage FB falls from its upper limit level.

As the output voltage rises to the starting voltage (about 1000 V), the output current begins to flow to turn on the cold cathode fluorescent light FL, and the output voltage lowers to the operating voltage (about 600 V). Even at this point of time no excessive inrushing current will flow. The output current then gradually increases, while the output voltage remains at a substantially constant operating voltage. As the output voltage or output current goes up and the NPNs 235 and 238 are controlled accordingly, the feedback voltage FB is gradually decreased from the upper limit level by the feedback action of the feedback capacitors 136 and 137.

The output current increases with the slow start voltage SS, and at the same time the feedback voltage FB decreases. At the point of time when the feedback voltage FB becomes equal to the slow start voltage SS, the PWM comparator 214 quits comparing the triangular wave signal CT with the slow-start voltage SS to start instead comparing the triangular wave signal CT with the feedback voltage FB. This completes the slow start and the beginning of a steady operation of the inverter.

In the steady operation, the output current is controlled to remain at the predetermined level determined by the reference voltage (current reference signal) Vref2. The brightness of the cold cathode fluorescent light FL is determined by the level of the current flowing through it, so that in order to maintain this current level, a substantially constant operating voltage is applied thereto. However, although a high output voltage is required to turn on the cold cathode fluorescent light FL, only a low output voltage is required in the subsequent stage once it is turned on. As a result, in a steady operation, the feedback voltage FB is determined by the level of the output current.

Let us consider an instance in which the adapter ADP is disconnected from the battery BAT or the power supply voltage VCC sharply drops due to an abrupt increase of another load while the inverter of the invention is in a steady operation.

The load current is lowered by the sharp drop of the power supply voltage VCC. In the conventional inverter, if the load current lowers below a predetermined level, the duty ratio of the switching circuit will be set to a minimum value as a protective measure against an excess voltage generated by the turning off of the CCFL (or disconnection thereof). Because of this setting, when the inverter of a conventional electronic apparatus for example is used in a severely cold district, the load current of the CCFL can fail to recover its steady operational level, causing the inverter to be shut down.

In the present invention, a current-error signal is generated by the current-error signal generating circuit that comprises the capacitor 136, resistor 140, and first error amplifier 211, based on the current detection signal IS generated by the current detection circuit. In addition, a voltage-error signal is generated by the voltage-error signal generating circuit that comprises the capacitor 137, resistor 139, and second error amplifier 212, based on the voltage detection signal VS generated by the voltage detection circuit.

The feedback signal formation circuit that comprises the constant-current generator I1, the current controlling NPN 235 controlled by the current-error signal, and the voltage controlling NPN 238 controlled by a voltage control signal forms a feedback voltage FB in accordance with the magnitudes of the current-error signal and voltage-error signal. Under an actual operating condition, the feedback voltage FB is formed in accordance with the magnitude of either the current-error signal or the voltage-error signal.

The inverter has a switch drive circuit for forming the drive signals P1-N2 to switch the semiconductor switching circuits (in the form of MOSFETs 101-104) in accordance with the feedback signal FB. This switch drive circuit includes the triangular wave signal generation circuit 201 and the PWM comparator 214, and compares the triangular wave signal CT with the feedback signal FB to generate a PWM signal.

In the invention, therefore, if the load current decreases excessively due to a sharp drop of the power supply voltage VCC, the inverter will not limit the load current as in conventional inverters, but instead operates to recover the load current by means of a current feedback function it has. Thus, the inverter never falls into an adverse condition such as a shutdown. It should be noted that, although the brightness of the CCFL lowers momentarily due to a delay in the feedback of the output current, this delay lasts for only an extremely short time and has little influence on the viewability of the display screen.

In the present invention, if a reduction of the output current is induced by, for example, disconnection of the load, the voltage feedback function of the inverter is invoked to bring the output voltage to a level determined by a voltage reference signal. Thus, no over-voltage problem will ever occur.

Next, a case is considered where the adapter ADP is connected to the battery BAT, or another load has abruptly decreased, while the inverter of the invention is in steady operation, thereby causing a sharp rise in the power supply voltage VCC.

The sharp rise in the power supply voltage VCC is detected by the differentiation circuit within the feedback signal control circuit 160 that includes a series circuit of the capacitor 161 and the resistor 162. The transistor 163 is turned on by the output of this differentiation circuit to ground the eighth pin 8P via the variable resistor 164.

Thus, in the event that the power supply voltage VCC abruptly goes up, the current feedback function comes into play to bring the output current to a predetermined level. In this case, however, a conventional inverter gives the viewer of the display discomfort, since current feedback control takes some time (delay time) to take effect, so that the display momentarily brightens. Further, since the load current sharply increases for the delay time, it does some damage to the loads including the CCFL.

In the present invention, upon detection of such sharp rise in the power supply voltage VCC, the feedback voltage FB is promptly lowered to a predetermined level for a predetermined period of time through the feed-forward control thereof, without waiting for the current feedback control to take effect.

The predetermined period for the reduction of the feedback voltage FB can be set by adjusting the time constant of the differentiation circuit comprising the capacitor 161 and resistor 162. Moreover, the predetermined level of the feedback voltage FB can be set by adjusting the resistance of resistor 164.

When the predetermined period has elapsed and the transistor 163 is turned off, the level of the feedback voltage FB gradually returns from the reduced level to the level of the normal constant-current operation by the action of a current feedback control loop that includes the capacitor 136, resistor 140, and first error amplifier 211. This temporary change in the feedback voltage FB before the feedback control can be made comparatively small.

In this way, the invention provides the feedback signal control circuit 160 that performs feed-forward control of the feedback signal FB so as to directly lower the level of the feedback signal FB if the DC power supply voltage VCC abruptly goes up, thereby preventing the electric power outputted to the load from growing too much. As a consequence, unnecessary change in display condition can be suppressed to prevent viewer's discomfort. In addition, generation of overcurrent can be suppressed to minimize possible damage to the load.

It will be understood that the feedback signal control circuit 160 can be built in the controller IC 200, instead of providing it outside the controller IC 200 as in the embodiment described above. The capacitors 136 and 137 and resistors 139 and 140 can be also built in the controller IC 200, instead of providing them outside the controller IC.

INDUSTRIAL APPLICABILITY

An inverter and a controller IC therefor in accordance with the invention and the electronic apparatus utilizing the inverter can be properly employed in the back light source of a liquid crystal display of a notebook PC, TV set, and car navigation system.

The invention claimed is:

1. A DC-AC converter, comprising:
   a transformer having a primary winding and at least one secondary winding;
   a semiconductor switching circuit arranged to allow electric current to flow from a DC power supply through the primary winding in a first or a second direction;
   a current detection circuit arranged to detect the current flowing through a load connected to the secondary winding to output a current detection signal;
   a voltage detection circuit arranged to detect the voltage applied to the load to output a voltage detection signal;
   a current-error signal generating arranged to generate a current-error signal based on the current detection signal and a current reference signal;
   a voltage-error signal generating circuit arranged to generate a voltage-error signal based on the voltage detection signal and a voltage reference signal;
   a feedback signal formation circuit arranged to provide a feedback signal in accordance with the magnitudes of the current-error signal and voltage error signal;
   a switch drive circuit arranged to provide a drive signal that switches the semiconductor switching circuit on and off in accordance with the feedback signal; and
   a feedback signal control circuit arranged to change the feedback signal to reduce the electric power supplied to the load when the DC power supply voltage of the DC power supply sharply rises; wherein
   the feedback signal formation circuit includes:
      a current-error control transistor having a control input arranged to receive the current-error detection signal; and
      a voltage-error control transistor having a control input arranged to receive the voltage-error detection signal;
   the voltage-error control transistor is connected in parallel with the current-error control transistor to output the feedback signal from a node where the voltage-error control transistor is connected in parallel with the current-error control transistor;
   the feedback signal control circuit includes:
      a sharp-voltage-change detection circuit arranged to receive the DC power supply voltage and arranged to generate a sharp-voltage-change signal by differentiating the DC power supply voltage, the sharp-voltage-change detection circuit including a capacitor and a first resistor; and
      a reduction circuit including a transistor switch arranged to receive the sharp-voltage-change signal and a second resistor, the second resistor being connected in series between the transistor switch and the current-error control transistor and in series between the transistor switch and the voltage-error control transistor.

2. The DC-AC converter according to claim 1, further comprising:
   a triangular wave signal generation circuit arranged to generate a triangular wave signal; wherein
   the switch drive circuit includes a PWM signal generation circuit arranged to generate a PWM signal by comparing the feedback signal with the triangular wave signal upon receipt of the triangular wave signal from the triangular wave signal generation circuit and the feedback signal.

3. An electronic apparatus comprising:
   a battery;
   a DC-AC converter in accordance with claim 1 arranged to generate AC power from the DC voltage of the battery; and
   a light emitting apparatus arranged to be driven by the AC power supplied from the DC-AC converter.

4. The electronic apparatus according to claim 3, wherein the light emitting apparatus includes a CCFL.

5. The DC-AC converter according to claim 1, wherein the second resistor is a variable resistor, and a voltage level to which the feedback signal is reduced is adjusted by varying the resistance of the variable resistor.

6. A controller IC, arranged to drive a semiconductor switching circuit arranged to direct current from a DC power supply through a primary winding of a transformer in a first or a second direction to supply AC power to a load connected to a secondary winding of the transformer, the controller IC comprising:

a feedback signal formation circuit arranged to provide a feedback signal in accordance with the magnitudes of a current-error signal and a voltage-error signal, the current-error signal generated based on both a current detection signal associated with the current flowing through the load and a current reference signal, and the voltage-error signal generated based on both a voltage detection signal associated with the voltage applied to the load and a voltage reference signal;

a switch drive circuit arranged to provide a drive signal to switch on and off the semiconductor switching circuit in accordance with the feedback signal; and a feedback signal control circuit arranged to change the feedback signal to reduce the electric power supplied to the load when the DC power supply voltage of the DC power supply sharply rises; wherein the feedback signal formation circuit includes:

a current-error control transistor having a control input arranged to receive the current-error detection signal; and a voltage-error control transistor having a control input arranged to receive the voltage-error detection signal;

the voltage-error control transistor is connected in parallel with the current-error control transistor to output the feedback signal from a node where the voltage-error control transistor is connected in parallel with the current-error control transistor;

the feedback signal control circuit includes:

a sharp-voltage-change detection circuit arranged to receive the DC power supply voltage and arranged to generate a sharp-voltage-change signal by differentiating the DC power supply voltage, the sharp-voltage-change detection circuit including a capacitor and a first resistor; and a reduction circuit including a transistor switch arranged to receive the sharp-voltage-change signal and a second resistor, the second resistor being connected in series between the transistor switch and the current-error control transistor and in series between the transistor switch and the voltage-error control transistor.

7. The controller IC according to claim 6, further comprising:

a triangular wave signal generation circuit arranged to generate a triangular wave signal, wherein the switch drive circuit includes a PWM signal generation circuit arranged to generate a PWM signal by comparing the feedback signal with the triangular wave signal upon receipt of the triangular wave signal from the triangular wave signal generation circuit and the feedback signal.

8. The controller IC according to claim 6, wherein the second resistor is a variable resistor, and a voltage level to which the feedback signal is reduced is adjusted by varying the resistance of the variable resistor.

* * * * *